April 29, 1958  E. F. BRILL ET AL  2,832,909
CURRENT COLLECTOR FOR UNIPOLAR GENERATORS
Filed Nov. 5, 1956  2 Sheets-Sheet 2
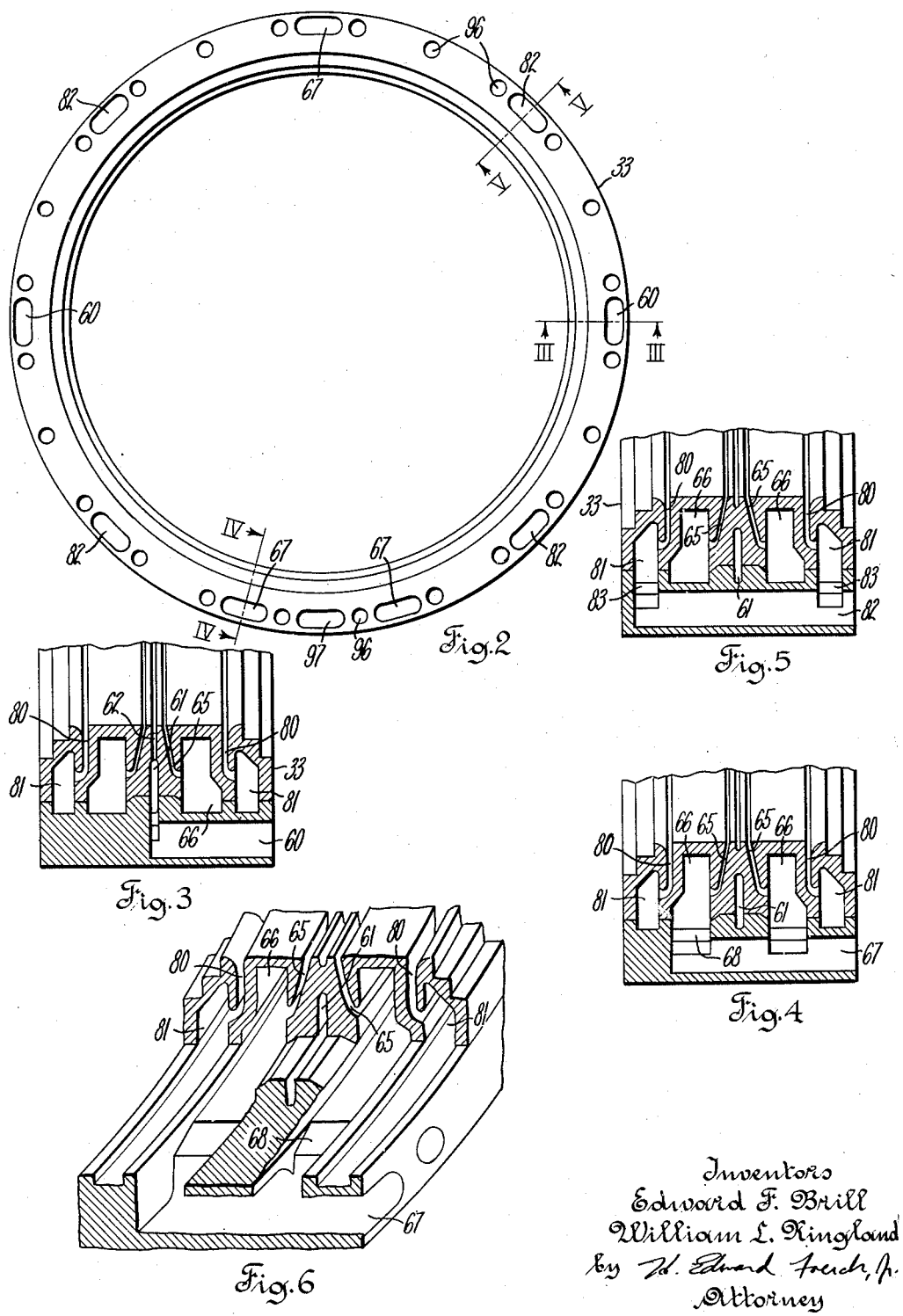
Inventors
Edward F. Brill
William L. Ringland
by W. Edward Foruch, Jr.
Attorney 2,832,909

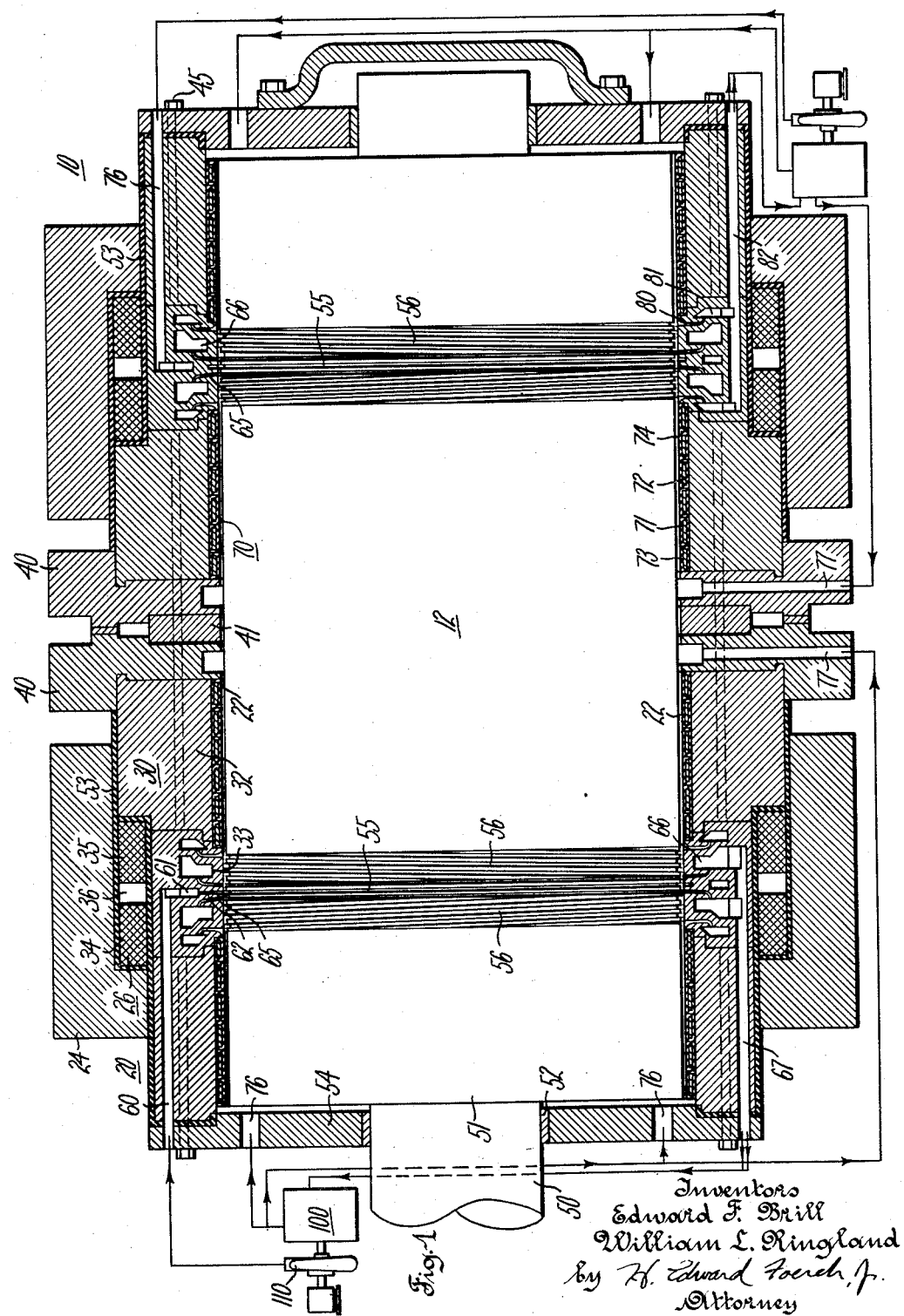

CURRENT COLLECTOR FOR UNIPOLAR GENERATORS

Edward F. Brill and William L. Ringland, West Allis, Wis., assignors to Allis-Chalmers Manufacturing Company, Milwaukee, Wis.

Application November 5, 1956, Serial No. 620,453

6 Claims. (Cl. 310—178)

This invention relates in general to unipolar generators, and more particularly to unipolar generators having liquid metal current collectors in which the current collector portion of the stator provides an improved arrangement for collection of fluids circulated in the air gap.

Electrically conductive liquid metal, such as a sodium potassium alloy, has been found to be an effective current collector in unipolar generators for conducting the high current generated in the rotor between the rotor and the current carrying portions of the stator and to the exernal circuit. Generally, the liquid metal is circulated from external reservoirs by external pumps to the current collector portion of the air gap and returned for recirculation. The liquid metal is supplied to the current collector portions of the air gap through a supply duct; it is distributed around the circumference of the rotor wetting the collector portions of the surfaces of the rotor and stator for conducting current therebetween, and it is discharged and reurned to the external reservoirs after it has flowed a short distance axially of the air gap.

Heretofore, grooves have been provided in the current collector portion of the stator with discharge ducts radially communicating with the grooves for returning liquid metal to the external reservoirs and pumps. As only a limited number of discharge ducts can be provided around the periphery of the generator to carry fluid from the grooves, some liquid metal flows back against the rotor with the possibility of entering the noncurrent collector portions of the air gap.

Therefore, these prior art arrangements for collection of the liquid metal do not completely collect the fluid and a small amount invariably strays into the noncurrent collector portion of the air gap. Such liquid metal may short circuit all or a portion of the generated voltage.

According to the present invention means are provided by the current collector portions of the stator which collect the liquid metal by the use of a trap effect and minimize the possibility of the fluid flowing back against the rotor. These means comprise an annular duct radially communicating with the current collector portion of the air gap at the point at which it is desired to collect the fluid. The annular duct which permits annular or 360 degree discharge from the air gap discharges to an annular discharge reservoir along a radially extending side or axially thereof and intermediate the radial limits of the collection reservoirs. The annular collection chamber traps the entering fluid and a duct is provided for draining the fluid from the collection reservoir back to an external reservoir.

With the present arrangement fluid is discharged from the air gap around its entire periphery and the possibilities of the flow flowing back against the rotor are minimized. Fluid entering the collection chamber is trapped and a minimum of a single duct may be used to drain the collection chamber.

It is therefore an object of the present invention to provide a unipolar generator having improved fluid collection means of air gap fluids.

Another object of this invention is to provide a unipolar generator having improved fluid collection means annular or 360 degree radial discharge for fluid from the air gap.

Another object of this invention is to provide a unipolar generator having improved fluid collection means which minimizes the possibilities of the fluid flowing back against the rotor and into the noncurrent collector portion of the air gap.

Other objects of the invention may be apparent upon reading the following description with the accompanying drawings, in which:

Fig. 1 is a longitudinal sectional view of a unipolar generator embodying the present invention;

Fig. 2 is a side view of the currnet collector of the stator of the unipolar generator shown in Fig. 1;

Fig. 3 is a view along lines III—III of Fig. 2;

Fig. 4 is a view along lines IV—IV of Fig. 2;

Fig. 5 is a view along lines V—V of Fig. 2; and

Fig. 6 is a sectional isometric view of a portion of the stator current collector of the unipolar generator shown in Fig. 1.

Referring more particularly to the drawings, a unipolar generator 10 is illustrated comprising a rotating armature member or rotor 12 and a stationary field structure or stator 20 which cooperates with the armature to define an air gap therebetween.

The stator 20 comprises two similar units each including an annular yoke 24 having field coil 26 disposed in the recessed portion thereof, and including an electrically conductive sleeve means 30 disposed coaxially with the yokes 24 and coil 26. The sleeve means 30 include end portions 31, 32 of magnetic material, such as iron, and intermediate current collector portions 33 which is of nonmagnetic conductive material, such as aluminum bronze. The magnetic portions 31, 32 of the sleeves serve as the poles for the field structure and are made integral with the current collector portions as by welding. Sleeve means 30 serve as a current carrying member of the field structure 20 for conducting current between the armature 12 and an external circuit.

Excitation coils 26 are symmetrically located about the current collector portions 33 of the sleeves and comprise two individual coils 34, 35 with a space 36 between the coils. Constructing the coils 26 in this manner permits operation of the generator at near rated voltage even with one coil of the individual coils 34, 35 disconnected, and in addition the construction allows insertion of a probe through a suitable opening in the yoke and the collector portion of the sleeves into contact with the surface of the rotor. Such a probe may be used to measure the electrical potential at the rotor surface with the rotor turning but before the collector portion of the air gap is filled with collector fluid, or it may be used as a gauge to measure clearance between the rotor and stator members. Splitting coil 26 further permits fluid ducts to be brought to or from the current collector portion of the sleeves through the space 36 between the two coils 34, 35, if desired.

Annular plates 40 integral with the adjacent ends of the sleeves 30 serve as bus rings for the sleeves. The annular plates or bus rings 40 are spaced apart by a ring of insulation 41. The ring of insulation 41 and bus rings 40 cooperate with the two sleeves 30 in joining them as a continuous sleeve.

Long nonmagnetic bolts 45 extending through holes 96 of the stator 20 firmly clamp the components of the stator together. These bolts are tightened such that a relatively large amount of elongation will take place, thus providing a spring effect which will retain tightness as the machined metals age or creep. All bolt heads are readily accessible from the outside of the machine with this arrangement.

The rotatable armature or rotor 12 comprises a shaft 50 including a cylinder 51 of magnetic material such as iron for the passage of field flux therein. Although rotor 12 is shown as solid, it may of course be milled for installing copper bars for greater conductivity. Shaft 50 is supported at opposite ends of the rotor in suitable bearings 52.

Insulation 53 is provided between the yokes 24 and the sleeves 30, and around the coils 26. The end plate 54 is also insulated from the sleeves 30. The long bolts are also insulated from the current carrying members.

The rotor 10 has spaced apart rings 55 which are aligned radially with the current collector portions 33. A suitable electrically conductive liquid metal, such as a sodium and potassium alloy, is supplied to the current collector portions of the air gap between the rings 55 and current collector portions 33 during operation of the generator. The rotor rings 55 and the current collector portions 33 are wetted by the conductive liquid metal which fills the gap therebetween. The rotor rings, the current collector portions and the conductive fluid serve as current collectors conducting current between the rotor 12 and the current conductive sleeves 30 of the field member.

In addition to rotor rings 55, the rotor cylinder has helical grooves 56 in its surface adjacent to the rotor rings 55. The grooves on one side of the rings are threaded oppositely to the grooves on the other side so that a predetermined direction of rotation of the rotor causes the collector fluid to be forced axially toward the rotor rings 55 from opposite sides thereof, thus tending to keep the fluid at the collector portions of the air gap.

Means are provided for cooling the collector fluid. Although the collector portion 33 of each sleeve 30 may be cooled by circulating a cooling fluid through suitable ducts therein, it is preferably cooled by circulation of the collector fluid through external reservoirs 100 and recirculated by external pumps 110. The fluid may be cooled by water tubes in the reservoirs or by other suitable means.

The collector fluid is supplied to each current collector portion of the air gap from external reservoirs 100 and pumps 110 by means including supply ducts 60, annular supply reservoirs 61 and inlet ducts 62. The supply ducts may extend from the end plates 54 through the sleeves 31 to the collector portions, as shown, or they may extend through the yokes 24 and between the split coils 26 to the annular supply chambers 61 in the collector portion of the sleeves.

The liquid metal is discharged through the inlet ducts 62 to the current collector portions of the air gap and forms annular rings wetting the surfaces of the rotor at rings 55 and the current collector portions 33 thereby providing electrical connections between the rotating armature member 12 and the stationary field member 20.

Supply ducts 60 extend from the end plates 54 at the ends of the generator to collector portions 33. Several such ducts may be positioned circumferentially of the stator to supply the annular supply chambers 61 at several points as shown in Fig. 2. Likewise, several inlet ducts 62 may be provided for both collectors radially connecting the supply chambers 61 to the air gap 22.

Annular discharge ducts 65 are formed in the collector portions 33 on both sides of and immediately adjacent to the inlet ducts 62. These annular discharge ducts extend radially from the air gap to provide annular or 360 degree discharge from the air gap for liquid metal. The discharge ducts 65 communicate with annular discharge reservoirs 66 along a radially extending side or axially thereof at a desired point intermediate the radial limits of the reservoirs. This construction provides a trap for fluid discharging from the air gap through discharge ducts 65 and entering the discharge reservoirs 66 with the possibility of fluid flow back against the rotor minimized.

Several return ducts 67 may be provided circumferentially of the sleeves 31 and manifolded to the annular discharge reservoirs 66. These return ducts 67 connect discharge reservoirs 66 of the current collector portion of the sleeves to the external reservoirs 100 and pumps 110 for recirculation of the liquid metal.

Although any means may be used to connect return ducts 67 to discharge reservoirs 66, these ducts are preferably extended axially into the current collector portion of the sleeves radially outside of the annular reservoirs 66. The ducts 67 are connected to annular discharge reservoirs 66 by a duct 68 extending radially between the discharge reservoirs 66 and ducts 67. The discharge reservoirs 66 on each side of the supply ducts 60 may discharge to the same discharge ducts 67 or to separate ducts for returning the liquid metal to the cooler reservoirs.

As the rotor is turning at a relatively high speed, a small amount of the liquid metal vaporizes and some of this liquid metal enters the air gap outside of the collector area. Means are provided for returning the collector fluid to the external reservoirs 100. These means comprise a flow of gas along the air gap toward the current collector portion 33 of the sleeves. Any gas which does not react chemically with the collector fluid such as nitrogen may be used.

The gas is supplied to the air gap at each end of both sleeves by means of ducts 76 positioned in end pieces 54 and ducts 77 extending through plates 40 at the center of the machine. The gas flow is from the ducts 76 and 77 along the air gap toward the current collector portions 33. Although the gas is shown supplied at the ends and center of the machine, it could be supplied directly at both ends of the collector portions 33, if desired. However, when the gas is supplied at the ends and midpoint of the rotor, the gas blows along the surface of the rotor and thus additionaly contributes to the cooling of the rotor.

Means are provided by the current collector portions 33 for collecting the gas and any suspended liquid metal carried by the gas. These means comprise annular discharge ducts 80, annular gas discharge reservoirs 81 and return ducts 82. Discharge ducts 80 and discharge reservoirs 81 are provided on both sides of the inlet ducts 62. Liquid metal annular discharge ducts 65 and liquid metal collection reservoirs 66 are intermediate discharge ducts 80 and discharge reservoirs 81.

The annular discharge ducts 80 for gas discharge are constructed in the same manner as annular discharge ducts 65 are constructed. Discharge ducts 80 extend radially from the air gap to provide annular or 360 degree discharge from the air gap for the gas and any liquid metal carried by the gas. The discharge ducts 80 also communicate with annular reservoirs 81 along one radially extending side or axially thereof at a desired point intermediate the radial limits of the reservoir to provide a trap for any liquid metal carried by the gas.

Several return ducts 82 may be provided circumferentially of the sleeves 31 and manifolded to the annular discharge reservoirs 81 to return the gas and liquid metal to the external reservoirs for separation, cooling and recirculation. Return ducts 82 extend axially into the current collector portions 33 radially outside of the annular discharge reservoirs 81. Return ducts 82 are connected to the annular discharge reservoirs 66 by a duct 83 extending between the annular reservoirs 81 and the return ducts 82. This arrangement for connecting the annular reservoirs with the external reservoirs permits as many return ducts to be manifolded to the collection reservoirs as desired, or it permits a minimum of one return duct from the two collection reservoirs of each current collector portion.

Rotation of the rotor, in conjunction with the radial annuli 80 has been found to produce sufficient gas flow for scavenging purposes without a separate gas blower, although a blower could be added to the gas circulation system, if desired.

Separation of liquid metal entrained in the gas is accomplished in reservoir 100 by gravity, condensation or other known separation means.

Insulation means 70 are provided along the inner surface of the sleeves 30 of the stationary field member 20. This insulation means offers protection against short circuiting between the rotor and the stator in the event liquid metal escapes from the current collector portions of the air gap.

Insulating means 70 are shown as comprising a plurality of annular rings or bands 71 positioned side by side on the radially inner surface of the sleeves from the end plates 54 to the collector portions 33, and from the collector portions 33 to the annular plates 40. The annular rings 71 may be positioned on the stator surface or on the rotor surface, and other forms of insulation may be used.

At rotor standstill the collector fluid returns through drain duct 97 to the reservoir 100. A suitable source of direct current, not shown, is connected to the field coils to energize the coils to produce uniform radial magnetic field in the air gap. The adjacent poles of the independent field structures have the same polarity. The rotor shaft is rotated by suitable known means. Liquid metal is circulated by means of external pumps through ducts 60, annular supply reservoirs 61 and inlet ducts 62 to the current collector portions of the air gap. The rotor rings 55 force the liquid metal to distribute itself about the current collector portions of the air gap where the fluid conducts current between the rotor and sleeves 30 of the stator.

The flow of the current in the sleeves is in an axial direction and is opposite the direction of flow of the current in the armature. The cross flux produced by the current in the sleeves reduces the cross flux produced by the current in the armature thereby keeping magnetic saturation and losses to a minimum. The two collectors connect the armatures for the two fields in series; the voltages generated are in series relation and therefore double voltage is obtained.

As the liquid metal distributes itself about the current collector portions of the air gap it also moves axially toward both ends of the generator. After the liquid metal has traveled axially a short distance, it is forced by centrifugal forces to enter annular discharge ducts 65 through which it flows to annular discharge reservoirs 66 where the liquid metal is trapped and discharged through return ducts 67 to the external reservoirs 100.

The air gap other than the current collector portions is continuously swept free of stray or vaporized liquid metal by the flow of gas axially along the air gap toward the current collector portions. The rotor causes the gas to rotate enough to cause natural pumping through the annular discharge ducts 80. The gas and any liquid metal carried by the gas discharges through ducts 80 to collection reservoirs 81 where the liquid metal is trapped. The gas and liquid metal are returned through return ducts 82 to external reservoirs 100 for separation, cooling and recirculation.

Other variations or modifications may be made in the embodiment of the invention shown by one skilled in the art without departing from the spirit of the invention or from the scope of the appended claims.

What is claimed is:

1. A unipolar generator comprising a rotatable armature having current collector portions, a stationary field member including an electrically conductive sleeve forming an air gap with said armature, said sleeve having current collector portions radially aligned with said armature current collector portions, said sleeve current collector portions comprising means supplying an electrically conductive fluid to current collector portions of said air gap between said sleeve current collector portions and said armature current collector portions for conducting current therebetween, said sleeve current collector portions further comprising fluid collection means including annular discharge reservoirs and annular discharge ducts on both sides axially of said fluid supply means, said annular discharge ducts communicating with said air gap to provide annular discharge for said fluid from said air gap and communicating with said discharge reservoirs between the radial limits thereof to trap entering fluid, and means including an external pump recirculating said fluid from said discharge reservoir to said supply means.

2. A unipolar generator comprising a rotatable armature having current collector portions, a stationary field member including an electrically conductive sleeve forming an air gap with said armature, said sleeve having current collector portions radially aligned with said armature current collector portions, said sleeve current collector portions comprising means supplying an electrically conductive fluid to current collector portions of said air gap between said sleeve current collector portions and said armature current collector portions for conducting current therebetween, said sleeve current collector portions further comprising fluid collection means including annular discharge ducts and annular discharge reservoirs on both sides axially of said fluid supply means, said annular discharge ducts radially communicating with said air gap to provide annular discharge for said fluid from said air gap and axially communicating with said discharge reservoirs between the radial limits thereof to trap entering fluid, and means returning said liquid metal to said supply means.

3. A unipolar generator comprising a rotatable armature having current collector portions, a stationary field member including an electrically conductive sleeve forming an air gap with said armature, said sleeve having current collector portions radially aligned with said armature current collector portions, said sleeve current collector portions comprising means circulating an electrically conductive liquid metal to and from current collector portions of said air gap between said sleeve current collector portions and said armature current collector portions for conducting current therebetween, means supplying an inert gas to said air gap on both sides axially of said sleeve current collector portions, said sleeve current collector portions further comprising gas collection means on both sides axially of said liquid metal supply means to collect said gas supplied to said air gap, said sleeve current collector portions further comprising liquid metal collection means on both sides axially of said liquid metal supply means and intermediate said gas collection means and said liquid supply means, said gas collection means including annular discharge ducts and annular discharge reservoirs, said annular ducts communicating with said air gap and with said discharge reservoirs to provide annular discharge from said air gap for said gas, and means recirculating said gas from said discharge reservoirs to said supply means.

4. A unipolar generator comprising a rotatable armature having current collector portions, a stationary field member including an electrically conductive sleeve forming an air gap with said armature, said sleeve having current collector portions radially aligned with said armature current collector portions, said sleeve current collector portions comprising means supplying an electrically conductive liquid metal to current collector portions of said air gap between said sleeve current collector portions and said armature current collector portions for conducting current therebetween, means supplying an inert gas to said air gap on both sides axially of said sleeve current collector portions, said sleeve current collector portions further comprising gas collection means on both sides axially of said liquid metal supply means to collect said gas supplied to said air gap, said sleeve current collector portions further comprising liquid metal collection means on both sides axially of said liquid metal supply means and intermediate said gas collection means and said liquid supply means, said liquid metal collection means and said gas collection means including annular discharge ducts and annular discharge reservoirs, said annular ducts communicating with said air gap and with said collection reservoirs to provide annular discharge from said air gap for said liquid metal and for said gas, and means providing a recirculating path for said liquid metal and said gas from said respective discharge reservoirs to said respective supply means.

5. A unipolar generator comprising a rotatable armature having current collector portions, a stationary field member including an electrically conductive sleeve forming an air gap with said armature, said sleeve having current collector portions radially aligned with said armature current collector portions, said sleeve current collector portions comprising means supplying an electrically conductive liquid metal to current collector portions of said air gap between said sleeve current collector portions and said armature current collector portions for conducting current therebetween, means supplying an inert gas to said air gap on both sides axially of said sleeve current collector portions, said sleeve current collector portions further comprising gas collection means on both sides axially of said liquid metal supply means to collect said gas supplied to said air gap, said sleeve current collector portions further comprising liquid metal collection means on both sides axially of said liquid metal supply means and intermediate said gas collection means and said liquid supply means, said liquid metal collection means and said gas collection means including annular discharge ducts and annular discharge reservoirs, said annular ducts communicating with said air gap to provide annular discharge from said air gap for said liquid metal and for said gas and said annular ducts communicating with said discharge reservoirs between the radial limits thereof to trap entering liquid metal and gas respectively, and means providing a recirculating path for said liquid metal and said gas from said respective discharge reservoirs to said respective supply means.

6. A unipolar generator comprising a rotatable armature having current collector portions, a stationary field member including an electrically conductive sleeve forming an air gap with said armature, said sleeve having current collector portions radially aligned with said armature current collector portions, said sleeve current collector portions comprising means supplying an electrically conductive liquid metal to current collector portions of said air gap between said sleeve current collector portions and said armature current collector portions for conducting current therebetween, means supplying an inert gas to said air gap on both sides axially of said sleeve current collector portions, said sleeve current collector portions further comprising gas collection means on both sides axially of said liquid metal supply means to collect said gas supplied to said air gap, said sleeve current collector portions further comprising liquid metal collection means on both sides axially of said liquid metal supply means and intermediate said gas collection means and said liquid supply means, said liquid metal collection means and said gas collection means including annular discharge ducts and annular discharge reservoirs, said annular ducts radially communicating with said air gap to provide annular discharge from said air gap for said liquid metal and for said gas and said annular ducts axially communicating with said discharge reservoirs between the radial limits thereof to trap entering liquid metal and gas respectively, and means including an external reservoir manifolded to said respective discharge reservoirs providing a recirculating path for said liquid metal and said gas from said respective discharge reservoirs to said respective supply means.

References Cited in the file of this patent

UNITED STATES PATENTS

| | | |
|---|---|---|
| 1,443,644 | Nobuhara | Jan. 30, 1923 |
| 2,588,466 | Barnes | Mar. 11, 1952 |
| 2,786,155 | Sellers | Mar. 19, 1957 |